Figure 1:
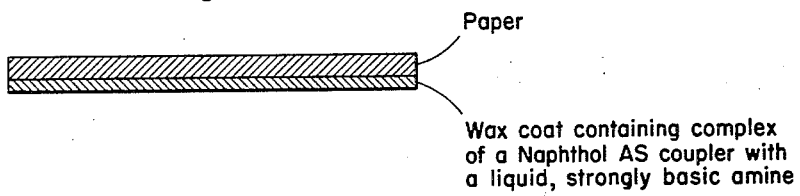

Aug. 23, 1960

C. STRECK 2,950,213

HECTOGRAPH CARBON PAPER

Filed Aug. 31, 1956

Paper

Wax coat containing complex of a Naphthol AS coupler with a liquid, strongly basic amine Paper Wax coat containing amine-stabilized diazoamino component and complex of a Naphthol AS coupler with a liquid, strongly basic amine Clemens Streck
*INVENTOR.*

BY
*ATTORNEYS*

2,950,213

HECTOGRAPH CARBON PAPER

Clemens Streck, Loudonville, N.Y., assignor to General Aniline & Film Corporation, New York, N.Y., a corporation of Delaware Filed Aug. 31, 1956, Ser. No. 607,281

3 Claims. (Cl. 117—36)

This invention relates to a composition obtained by reaction of a coupling component of the naphthol AS type on admixture with a liquid, strongly basic, amine, such as dicyclohexylamine, di(methylcyclohexyl)amine, diethyl amine, diisoamylamine, piperidine, and the like, and to hectograph processes and products in which they are used. The product, or complex formed on mixing a naphthol AS type coupler with an amine of the type indicated above has been found to have good solubility, or dispersibility, in the wax compositions of the type used in spirit duplicating systems (hectograph systems), and is thus useful in certain types of hectograph processes and products.

In the usual hectograph system, a finely particulate dyestuff, such as Crystal Violet, or Victoria Blue or Green, is incorporated in a molten oil-wax composition, and the mixture thoroughly ground to intimately disperse the dyestuff therein. The thus prepared molten ink composition may then be coated on a sheet of paper, whereupon, on cooling, there is formed a hectograph carbon paper. This carbon paper, as is well known in the art, is then used to make master sheets, from which further copies are made by moistening the master sheet with alcohol, or like solvent, and contacting the master sheet with copy paper.

While hectograph systems, of the foregoing type, have many desirable properties and fields of utility, primarily because of their flexibility in use and simplicity for production of multiple copies, there are a number of difficulties encountered therein, which have limited their field of utility. Certain of the difficulties, heretofore encountered in hectograph systems, which are due primarily because of the nature of the dyestuffs which have been suitable for the use therein, have been overcome to a considerable extent by recently developed processes, in which a dyestuff component, such as a stabilized diazonium salt, is incorporated in the oil-wax composition of the hectograph carbon paper, and is then transferred to the master, and the master contacted with copy paper, in the presence of moisture and a coupler, for the stabilized diazo dye intermediate; whereupon the print is produced on the copy paper. Alternatively, the copy sheet may be coated with a stabilized diazonium salt substantially free of color, and the coupling component may be incorporated in the wax-oil composition used on the hectograph carbon paper, which is then transferred to the master and, subsequently, transferred to the copy paper, so that a dyestuff is developed on the copy paper once the diazonium salt and coupler have been combined in the copy sheet. Such a system is described in U.S. Patent No. 2,634,677, of April 14, 1953, to Klimkowski and Florence.

The usual naphthol AS type components of the 3-hydroxy-2-arylcarboxylic acid arylide type do not lend themselves for use in this type of system wherein the coupling component is incorporated in the wax-oil composition: (1) due to the poor solubility or dispersibility, in wax-oil compositions used for producing hectograph carbon papers, of the coupling component for the diazo dye intermediate; (2) due to a tendency to saponify the wax, especially if alkali is present; (3) due to a tendency to decompose amine stabilized diazo amino compounds if alkali is not present.

It is therefore an object of the present invention to provide a hectograph carbon paper comprising a base sheet such as paper having thereon a wax coating containing the complex of a naphthol AS type of coupling component with a liquid, strongly basic amine.

In order to facilitate an understanding of the invention, there is submitted a single sheet of drawings in which the two figures illustrate embodiments of the present invention.

Figure 2:
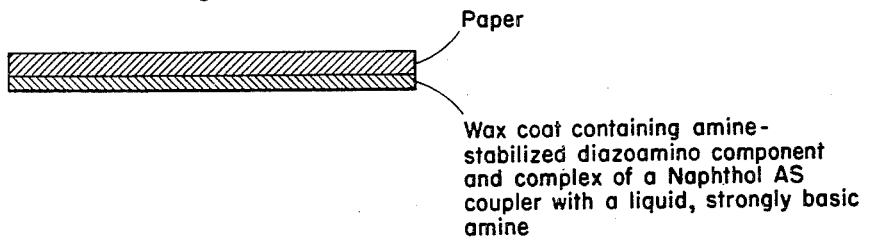

In these drawings,

Figure 1 is an enlarged sectional, elevational view showing in detail a hectograph carbon paper embodying features of this invention, and Figure 2 is a sectional, elevational view similar to that of Figure 1 showing a preferred modification in a hectograph carbon paper embodying features of this invention.

I have found that, when a naphthol AS type coupler is merely admixed with an equal molecular amount of a liquid, strongly basic amine, a chemical reaction takes place, as indicated by the heat of reaction; and that a fine crystal product is obtained, which has good solubility, or dispersibility, in wax-oil compositions of the type used in hectograph carbon papers.

The naphthol AS type couplers, which may be used in producing the naphthol AS-amine products of the present invention are the anilides and other arylides of adjacently substituted-oxyarylcarboxylic acids, and may be represented by the following general formula:

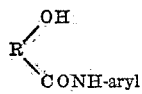

wherein the aryl radical may contain such substituents as lower alkyl (methyl), lower alkoxy (methoxy or ethoxy), nitro halogen (chlorine), arylamide (sulfonamide), amino or substituted amino, and combinations of the above, and wherein the —OH and —CONH-aryl substituents are in adjacent position; and wherein R stands for an aryl radical as exemplified by naphthalene, anthracene, carbazole, diphenylene oxide, diphenylene sulfide, benzocarbazole and dibenzocarbazole, etc., radicals. These naphthol AS type couplers are well-known in the diazo dyestuff art, and a number of specific couplers of this type, which may be employed for producing the product of the present invention are disclosed, for example, in the "Chemical Technology of Dyeing and Printing," by Louis Diserens, Reinhold Publishing Company, 1948, pp. 218 and 219.

In order to fully illustrate the novel products of the present invention, the following specific example is given.

*Example*

Equal molecular proportions of naphthol AS (2,3-oxynaphthoic acid anilide) and dicyclohexylamine were mixed with stirring, at room temperature. A reaction occurred promptly, as evidenced by slight rise in temperature of the reaction mixture, and the product was recovered in the form of fine chartreuse crystals.

43 parts of the thus obtained naphthol AS-dicyclohexylamine crystalline product were mixed with 65 parts by weight of a commercial amine-stabilized diazo dye intermediate (4-benzoyl-2,5-diethoxyaniline diazotized and stabilized with methyl taurine). The diazo dye intermediate and naphthol AS dicyclohexylamine product were in approximately equal molar proportions, the difference being due to standardizing agents in the diazotized intermediate.

A molten hectograph wax composition was then prepared by heating and mixing the following:

45 parts sugar cane wax
5 parts beeswax
10 parts castor oil
40 parts triisopropanolamine The mixture of diazo dye intermediate and naphthol AS-dicyclohexylamine reaction product, prepared as above, were then incorporated in the molten wax composition with thorough grinding. The resulting molten product was then coated on paper and allowed to cool to produce a hectograph carbon paper. Hectograph master sheets were then prepared, using this carbon paper in the usual manner, and further copies were then obtained on copy paper from the master sheet, using, as a solvent, a mixture of 90 parts alcohol and 10 parts glacial acetic acid. The blue dyestuff developed rapidly on the copy paper and copies could be used immediately, without offset, or smearing, of the dye image. Repeated copies could be obtained from a single master.

It will be understood that the foregoing example is illustrative of the novel product of the present invention, and its method of use. Various modifications will suggest themselves to those skilled in the art.

For making hectograph copies by a process in which the novel naphthol AS-amine products of the present invention are employed, there may be used, as the diazo dyestuff intermediate, essentially any known amine stabilized diazo dye intermediate. Such products are well-known in the azoic dye art, and a number of specific products are disclosed, for example, in "Chemical Technology of Dyeing and Printing," by Diserens (supra) especially pages 302–320.

One of the principal advantages of the novel naphthol AS type coupler-amine complex of the present invention, when used in hectograph processes and products, is the greatly improved solubility, or, more accurately, dispersibility, of this product in hectograph wax compositions, as compared with the straight naphthol AS type couplers. A further advantage of the novel products of the present invention, as compared with the usual naphthol AS type couplers, in hectograph products and processes, is that, if an alkali-naphthol AS type coupler is used in the hectograph process or product, its relatively high alkalinity tends to saponify the hectograph wax at the raised temperature of incorporation into the wax; while, on the other hand, if the naphthol AS type coupler, as free acid, is incorporated into the wax, along with amine stabilized diazo amino compounds, the acidic naphthol coupler will tend to decompose the amine stabilized diazo amino compound. The naphthol AS type coupler-amine products of the present invention do not have sufficient basicity to saponify the hectograph wax, but, at the same time, are sufficiently basic to have no decomposing influence on the amine-stabilized diazo amino compound.

It will, thus, be apparent that fullest advantage of the novel products of this invention, when used in hectograph processes and products, are obtained if a mixture of both the naphthol AS type coupler-amine product of the present invention, and an appropriate amine-stabilized diazo amino compound are incorporated in the hectograph wax used in the hectograph carbon paper. Such mixtures like the known mixtures of the usual naphthol AS type couplers, with amine stabilized diazo amino compounds, used in the azoic dye art, are stable under alkaline to neutral conditions, but couple rapidly with the formation of an insoluble azo dye, when made acid. However, if desired, it will be apparent that only one of the dye-forming components, i.e., either amine-stabilized diazo amino compound, or the naphthol AS-amine product may be incorporated in the hectograph carbon oil-wax composition; and the other dye-forming component may be present, for example, as a surface coating on the copy paper, or may be added along with the solvent and acid, used to moisten the copy paper; so that, in any event, a dye image is formed and developed on the copy paper. If only one of the dye-forming components is incorporated in the hectograph wax, it is preferred to incorporate the naphthol AS-amine product in the wax composition, due to its improved solubility in the hectograph wax. While less advantage is obtained using the products of the present invention, if the amine-stabilized diazo amino compound is incorporated in the hectograph wax, and the naphthol AS-amine product is added to the solution used to moisten the copy paper, or as a surface coating on the copy paper, such a method of operation is, of course, feasible and operable.

It will also be appreciated that, while I have, in the foregoing example, employed a preferred oil-wax hectograph composition of the type disclosed in the co-pending application of W. G. Drautz, Serial No. 476,603, filed December 20, 1954, and entitled "Hectograph Compositions," the novel products of the present invention may also be used in a hectograph process with other known oil-wax compositions, since, for example, those disclosed in U.S. Patents Nos. 2,454,700 and 2,634,677.

As previously indicated, a wide variety of stabilized diazo amino compounds may be employed as the diazo component used with the naphthol AS-amine coupler product of this invention; and, in order to more fully illustrate the specific embodiments of the present invention, there are given below, in tabular form, a number of specific stabilized diazo amino compounds, which may be used; and, also, specific novel products of naphthol AS type couplers, combined with amines are also the color of dye formed in hectograph copies made, using these specific components in the manner disclosed in the foregoing example.

| Diazo Compound of— | Stabilizer | Coupling Component | Amine | Shade |
|---|---|---|---|---|
| 2-Aminodiphenl | Methyl taurine | 3-Hydroxy-2-naphthanilide | Dicyclohexylamine | Bluish red. |
| 4-Benzoylamino-2, 5-diethoxyaniline | Methyl taurine | 3-Hydroxy-2-(2'-methyl-5'-diethylsulfamyl)-naphthanilide | Diethylamine | Reddish blue. |
| m-Chloroaniline | Sulfoanthranilic acid | 3-Hydroxy-2-(o-naphthanisidide | Dicyclohexylamine | Orange. |
| 5-Chloro-o-toluidine | Methylisoanthranilic acid | 3-Hydroxy-4'-chloro-2-o-naphthanilide. | Methylcyclo-hexylamine | Red. |
| 5-Nitro-o-anisidine | Ethylanthranilic acid | 3 - Hydroxy - 2', 5'- dimethoxy - 2 - naphthanilide. | Piperidine | Red. |
| Dianisidine | Methylanthranilic acid | 3-Hydroxy-2-naphthanilide | Dibutylamine | Dark Blue. |
| 2,5-Dichloroaniline | Ethylanthranilic acid | 3 - Hydroxy - 4' - methoxy - 2 - naphth-o-toluidide. | Piperidine | Brownish orange. |
| Dianisidine | Methylanthranilic acid | 2 - Hydroxy - 3 - carbazolecarboxylic acid anilide. | Dicyclohexylamine | Blue black. |

The naphthol AS type coupler-amine products, illustrated in the above table, are prepared by merely mixing and grinding the two materials in the same manner as the complex of naphthol AS and dicyclohexyl amine was prepared in the foregoing example. It will also be appreciated that the specific naphthol AS type coupler used will, in general, be chosen with regard to the particular stabilized diazo amino compound employed, as is done in the azoic dye art. As indicated in the table, a number of specific amines may be employed for preparing the novel complexes thereof with naphthol AS type couplers.

The amines which are usable in this case are liquid, strongly basic primary and secondary amines of the $C_{1-6}$ alkyl, cycloalkyl and hetero groups (excluding aryl), and may be exemplified by:

Diethylamine
    Diisoamylamine
    Butylamine
    Hexylamine
    Cyclohexylamine
    Dicyclohexylamine
    Di(methylcyclohexyl)amine
    Piperidine
    Morpholine
    Pyridine

I claim:

1. A hectograph product comprising a base sheet having thereon a hectograph oil-wax composition, in which there is intimately dispersed a mixture of an amine stabilized diazo amino component, and a complex of a naphthol AS type coupler, of the formula

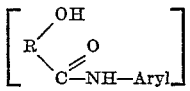

wherein R represents an aryl radical in which the hydroxyl and amido substituents shown are in ortho position to each other, with a liquid strongly basic amine.

2. A hectograph product comprising a base sheet and having thereon a coating of a hectograph oil-wax composition, in which there is intimately admixed a complex of a naphthol AS type coupler of the formula

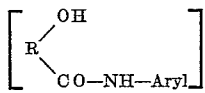

wherein R represents an aryl radical in which the hydroxyl and amido substituents shown are in ortho position to each other, with a liquid strongly basic amine.

3. A hectograph product comprising a base sheet having thereon a coating of a hectograph oil-wax composition, in which there is intimately admixed the complex of naphthol AS with dicyclohexylamine.

References Cited in the file of this patent

UNITED STATES PATENTS

| | | |
|---|---|---|
| 2,364,359 | Kienle et al. | Dec. 5, 1944 |
| 2,634,677 | Klimkowski et al. | Apr. 14, 1953 |
| 2,649,353 | Streck | Aug. 18, 1953 |
| 2,738,727 | Dorman et al. | Mar. 20, 1956 |
| 2,748,024 | Klimkowski et al. | May 29, 1956 |
| 2,752,393 | Martin | June 26, 1956 |
| 2,755,201 | Webber et al. | July 17, 1956 |
| 2,763,683 | Beman et al. | Sept. 18, 1956 |
| 2,873,668 | Klimkowski | Feb. 17, 1959 |

FOREIGN PATENTS

| | | |
|---|---|---|
| 533,439 | Great Britain | Feb. 13, 1941 |
| 699,194 | Great Britain | Nov. 4, 1953 |